UNITED STATES PATENT OFFICE.

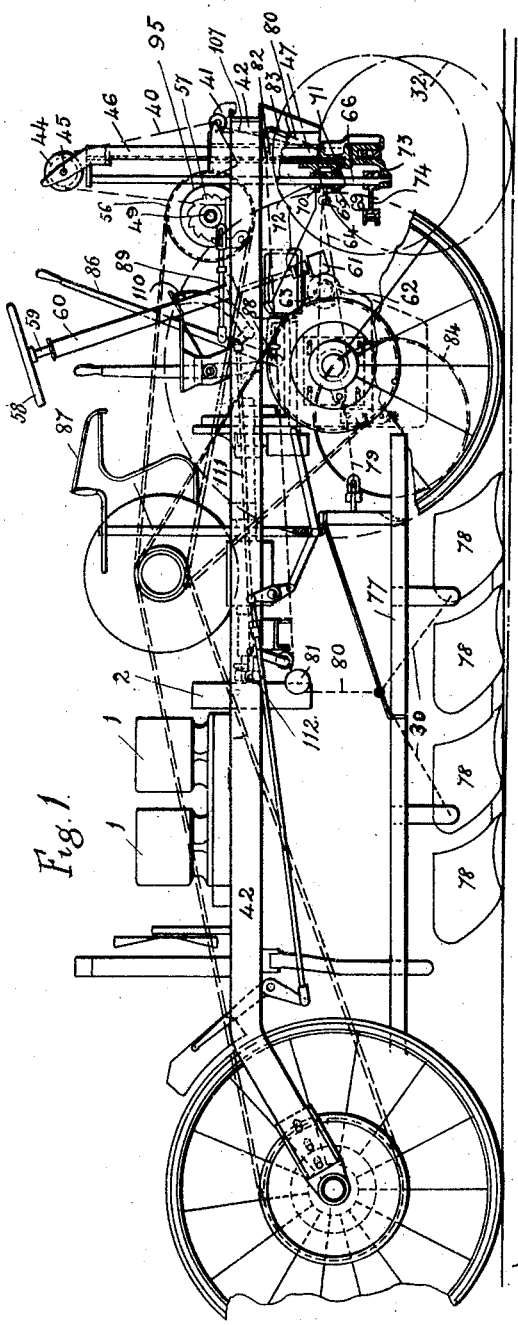

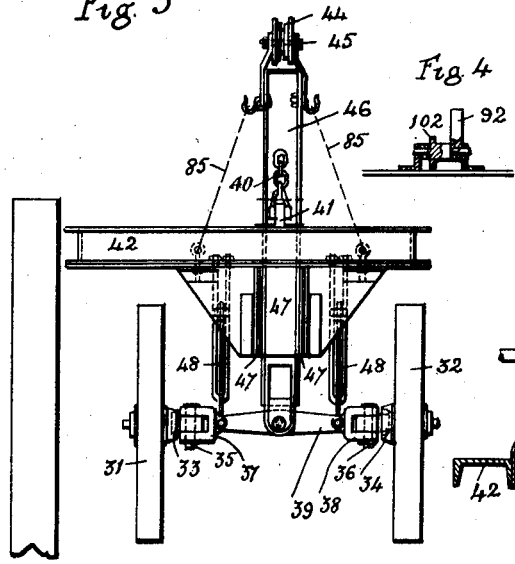

WILLIAM THOMAS BELL, OF LINCOLN, WILLIAM HARDY WATSON, OF WELLINGORE, AND LEONARD WILLIAM JONES, OF LINCOLN, ENGLAND.

MOTOR-PLOW.

1,338,550.  Specification of Letters Patent.  Patented Apr. 27, 1920.

Application filed October 23, 1916. Serial No. 127,228.

*To all whom it may concern:*

Be it known that we, WILLIAM THOMAS BELL, WILLIAM HARDY WATSON, and LEONARD WILLIAM JONES, subjects of the King of Great Britain, residing at Lincoln, England, Wellingore, England, and Lincoln, England, respectively, have invented certain new and useful Improvements in Motor-Plows, of which the following is a specification.

This invention relates to that class of motor plow in which the motor and necessary gearing and plows and steering wheels are combined as one apparatus and in which one driving wheel is positioned in a furrow already made or after being made by a plow positioned in front and the frame and plows are raised on the front and back wheels. In such classes of machine only one driving wheel runs on the furrow and the frame and plows are lifted by hand.

In the improved motor plow below described two driving wheels of the tractor are employed which when plowing run at the bottom of two furrows, and as these two wheels carry the greater portion of the weight of the machine, the front or steering wheels which travel over the unplowed land exert a comparatively small pressure on the soil. In this way the objectionable packing effect usually produced during direct plowing is minimized, and the driving wheels in rainy weather get a better grip of the soil on account of the land at the bottom of the furrows being much firmer and consequently less slippery than the soil on the surface.

In general arrangement the motor plow mainly consists of a frame carrying two driving wheels one at the end and preferably at about the center line of the frame, the other being at the side and near the front of the frame at which part are positioned two steering wheels connected by the usual mechanism to a steering post. The two driving wheels are connected through suitable mechanism to a prime mover positioned on the frame.

The steering wheels are carried by a column or other suitable means positioned preferably vertically in the front portion of the frame and in such a manner that the frame can be raised and lowered from the prime mover by suitable mechanism about the column and independent of the steering wheels, so that the side driving wheel and the plows can be positioned in the furrows or lifted therefrom when desired.

Suitable mechanism and gear is provided to the various operating parts to effect the purpose intended.

The plows when in multiple are arranged in staggered order the last plow being situated in front of the rear driving wheel to form the furrow for that wheel and such plows are preferably slung from the frame and pulled along by a chain secured to the axle or near to the axle of the side driving wheel.

The machine can also be employed as a tractor by lifting the plows clear of the ground, and positioning the side driving wheel on the axle of the end driving wheel and employing a draw bar on the axle and by positioning an extra shaft gear and driving pulley the machine can be employed for driving a threshing or other machine.

The invention will be clearly understood from the following description aided by the annexed drawings in which—

Figure 1 is a side elevation partly broken away and Fig. 2 a plan view of the complete plow.

Fig. 3 is a front elevation of the steering gear.

Fig. 4 is a detail section through the brake lever and pawl centers.

Fig. 5 is a plan, partly in section, of the steering gear.

Fig. 6 is a side elevation and Fig. 7 a plan view of the lifting gear.

Fitted to the machine frame is an engine 1, say a 24 to 30 H. P. petrol motor connected to a flywheel 2, and a suitable system of transmission.

The front steering wheels 31, 32 revolve upon stub axles 33, 34 of the Ackerman type, which are capable of swiveling on pins 35, 36 between the jaws 37, 38 formed at the ends of the front axle 39.

The unbalanced portion of the weight of the front end of the machine is transmitted to the front axle 39 by means of a chain or cable 40, attached at one end to a bracket 41 which is bolted to the frame 42 and at the other end to a drum 43 around which it is coiled.

This chain or cable 40 passes over a pulley 44 which revolves on a pin 45 and is supported by the top of a column 46 this column 46 being capable of moving vertically in guides 47, 47 and resting upon and secured to the front axle 39.

Two sets of links 48, 48 form a limiting connection between the front axle 39 and the frame 42 of the machine.

The drum 43 around which the chain or cable 40 is coiled has a brake drum 95 formed on one of its flanges and is driven by a shaft 49 which is supported in bearings 50, 51, attached to the frame. This shaft 49 carries a sliding collar 52 operating a friction clutch engaging with rim 94 which is secured to chain wheel 56.

This chain wheel 56 revolves normally on its supporting shaft 49 and is driven by a chain 54 and chain pinion 55 from the worm wheel shaft 18.

A ratchet wheel 57 is also secured to the drum shaft 49.

The steering gear consists of a steering wheel 58 and post 59 carried by a column 60, the steering post 59 carrying a worm 61 meshing with a wheel 62 on a chain barrel 63 around which the steering chains 64, 64 are coiled. These chains 64, 64 are attached to the ends of a bell crank lever 65 which fits a square vertical shaft 66. The chain barrel 63 is carried by bearings 67, 68 affixed to the frame of the machine.

The bell crank lever 65 is positioned between two brackets 69 70 which carry bushes 71 72 and which brackets are fastened to the guides 47 of the machine. These bushes fit the square shaft internally and circular holes in brackets externally.

At the bottom of the column 46 and attached thereto is a bracket 73 which supports the square shaft 66 and above this bracket 73 with its boss fitting the square shaft is a lever 74 which is connected by means of links 75 75 to the stub axle levers 76 76.

The plow frame 77 to which are attached the plows 78 is connected to the machine by draft chains 79 and lifting chain 80.

This lifting chain 80 passes around pulleys 81, 82, 83 on the frame 42 and is attached at the other end to the bottom of the square shaft 66 or column 46 so that as the front of the frame 42 is raised the plow frame 77 is raised also.

84 is a supplementary wheel connected to the frame on the opposite side to the driving wheel 28 and is capable of adjustment so that whether traveling on the roads or plowing it is normally only just clear of the ground. The function of this supplementary or balance wheel is to counteract any tendency the machine has to overbalance on that side.

85—85 are adjustable chains attached to the top of the column 46 and frame 42 to limit the amount the frame may be lowered.

The mechanism for operating the lifting drum 43 consists of a hand lever 86 situate near the driver's seat 87 such handle 86 being pivoted to the frame 42 at 88, and also has pivotally connected to it a rod 89 provided at its end with a slot 90 in which engages a pin 91 of a pawl 92 which engages the ratchet wheel 57. On rod 89 is also positioned one end of a bell crank lever 93 the other end of which actuates the sliding collar 52 which engages the friction clutch with the rim 94 for communicating motion to the shaft 49.

95 is a brake drum on the winding drum 43 with which any suitable braking mechanism can be employed.

The friction clutch may be of any suitable construction and is, therefore, not illustrated in detail herein. The braking appliance comprises a strap 101 surrounding the brake drum 95 and connected at one end to one end of a T lever 102, the other end being connected to another end of the T lever 102 while the remaining end of the T lever is connected to a spring 103 which is attached to the frame, the tendency of the spring being to keep the band 101 loose, and hold pawl 92 in contact with ratchet wheel 57. The bell crank 93 has a forked end 93ᵃ which engages with rod 89 so that on the movement of the rod 89 forward, the clutch is engaged with the rim 94 and the winding drum 43 coils the cable or chain 40 the brake band 101 being free, but on the opposite movement of the rod 89 the pawl 92 will be removed and the T lever will tighten the band 101 on the drum 95 and the apparatus can be lowered slowly.

To prevent overwinding we connect to the forecarriage form 73, a cable 107 the upper end of which is connected to a bell crank lever 108 pivoted to the guide 47 and carrying a rod 109 so that when the frame and guides 47 reach their maximum height the bell crank lever 108 will be moved and in turn will actuate the rod 109 which rests on and engages with the bell crank 93 thus releasing the clutch within rim 94 and stopping further lifting action.

We also provide a foot lever 110 connected to the frame and carrying a rod 111 connected with clutch mechanism 112 controlling the engine.

A usual brake for retarding the rotation of the rear wheels may be provided.

Before starting to plow with the motor plow it is first necessary to throw up one or more ridges with a single plow. These ridges are formed by the soil turned over from two furrows plowed close together, the ridge being thus formed between them. This preliminary work is done preferably by a single horse drawn plow. The greater part of the rest of the field can then be plowed by the motor plow with its multiple plows.

The headlands and any other parts which cannot be conveniently plowed by the motor plow are dealt with by the horse drawn plow.

In starting the plow with the motor the machine is steered into position so that the front driving wheel 28 rests in one of the furrows already plowed. Before this wheel 28 enters the furrow, however, the machine has been traveling with the frame 42 and plows 78 raised, but while the front driving wheel 28 is being steered into the furrow, the front of the machine is lowered in relation to the front wheels 31, 32 by means of the chain and its operating mechanism.

The effect of lowering this frame is to drop the front driving wheel into the furrow and lower the plows on to the land, so that the first plow cuts another furrow next the furrow already plowed, and the last plow cuts a furrow in front of the driving back wheel. The front of the machine is lowered in relation to the front wheels 31, 32 by the lever 86 being pulled back by the driver. This movement of the lever 86 disengages pawl 92 causing the weight of the machine to unwind the chain or cable 40 and the front of the machine and with it wheel 28 is thus lowered.

The action of pulling back lever 86 also operates the brake band 101 and thus prevents the front of the machine dropping too rapidly. The amount the front drops is limited by the chains 85, 85.

As the front drops the distance between the front axle 39 and the frame 42 being lessened the lifting chain 80 lowers the plows into position for plowing. Plowing is then proceeded with, the first plow cutting another furrow next the one already plowed and the last plow cutting a furrow in front of the back wheel.

At the end of the field the operator pushes forward lever 86 which puts the friction clutch into operation and shaft 49 and with it drum 43 are revolved, winding the frame up and thus raising wheel 28 from the furrow and also lifting the plows clear of the land.

Bell crank lever 93 actuated through cable 107 prevents overwinding, as the clutch is thereby disengaged when the frame is lifted to a certain maximum height.

At the highest position of the frame the links 48 48 are moved to their extreme position, and thus hold the axle 39 firmly in a horizontal position. While in this position, with the frame and wheel 28 raised, the machine travels on three wheels 31, 32, and 27 on the three point principle when not plowing, and is thus able to turn in a small radius at the end of the field. While plowing the wheel 84 and the two wheels 27 and 28 form another three point suspension system which enables the machine to adapt itself to irregularities in the ground surface, so that whether plowing or traveling over the unplowed land, the three point suspension system is maintained and no severe resulting strains due to uneven ground surface are set up.

What we claim and desire to secure by Letters Patent is:—

A motor plow comprising, in combination, a main frame carrying two staggered driving wheels, two parallel steering wheels and steering mechanism therefor, a prime mover having mechanism for connecting it to the driving wheels, a plow-carrying frame connected to the main frame, plows on said plow-carrying frame, mechanism for carrying the plow frame and for connecting the same to the main frame, mechanism operable by the prime mover for lifting the main frame, the prime mover, the steering, driving and lifting mechanism, the plow frame and plows and the front driving wheel on the steering wheels and rear driving wheel, mechanism for arresting the lifting movement of the frame and plows and for disconnecting the same from the prime mover, and brakes for controlling the lifting devices when lowering.

In testimony whereof we have hereunto set our hands in presence of two subscribing witnesses.

WILLIAM THOMAS BELL.
WILLIAM HARDY WATSON.
LEONARD WILLIAM JONES.

Witnesses:
ALBERT EDWARD DENNISON,
HENRY LOWDEN.